No. 663,502. Patented Dec. 11, 1900.
D. E. LAIN.
METHOD AND PROCESS OF REFRIGERATING MILK OR OTHER PERISHABLE FOODS FOR PRESERVATION AND TRANSPORTATION.
(Application filed June 28, 1899.)
(No Model.)
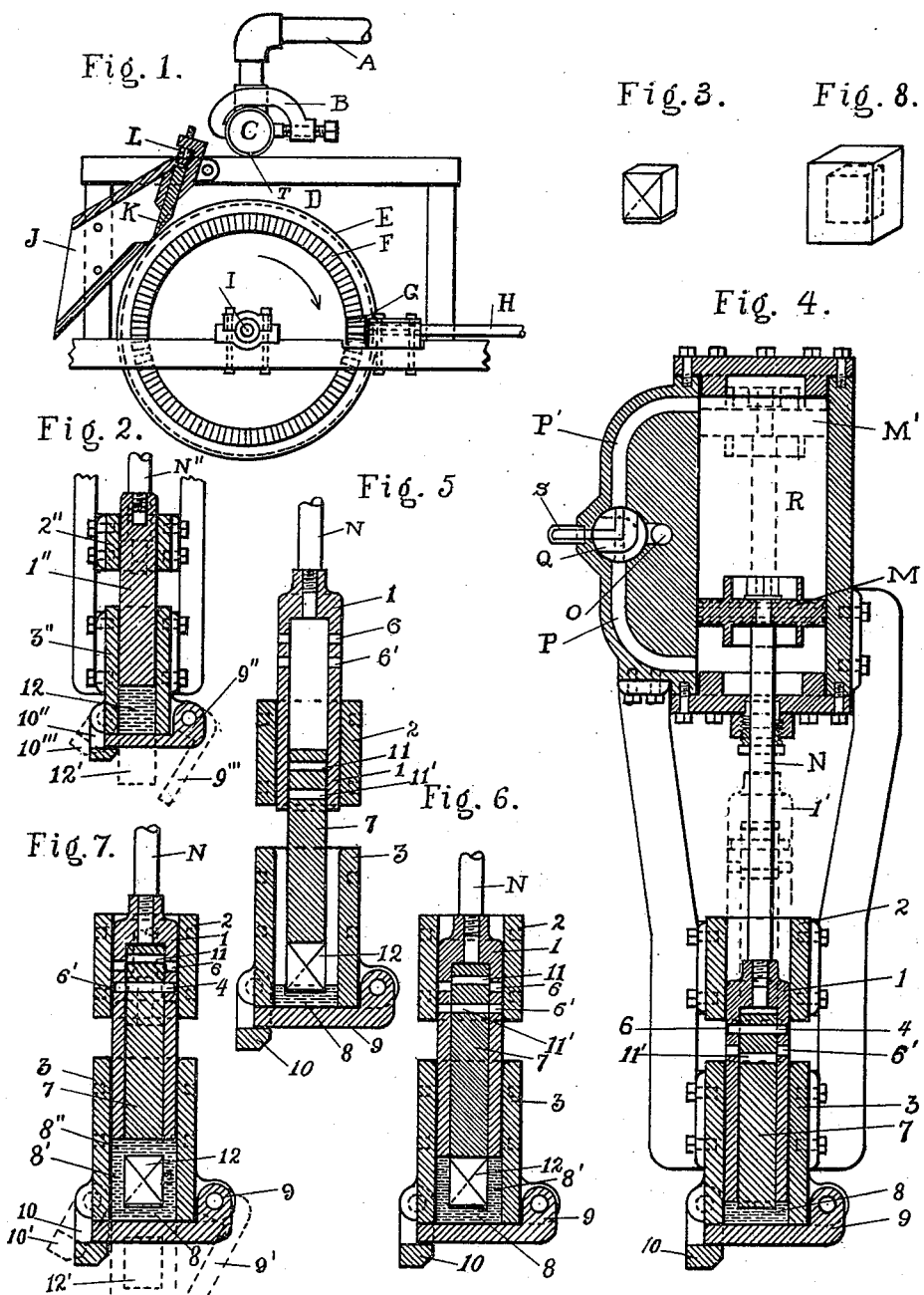
WITNESSES:
A. M. Lain
F. A. Heath
INVENTOR
David E. Lain.

UNITED STATES PATENT OFFICE.

DAVID E. LAIN, OF MIDDLETOWN, NEW YORK.

METHOD AND PROCESS OF REFRIGERATING MILK OR OTHER PERISHABLE FOODS FOR PRESERVATION AND TRANSPORTATION.

SPECIFICATION forming part of Letters Patent No. 663,502, dated December 11, 1900.

Application filed June 28, 1899. Serial No. 701,068. (No specimens.)

*To all whom it may concern:*

Be it known that I, DAVID E. LAIN, a citizen of the United States, and a resident of the city of Middletown, in the county of Orange and State of New York, have invented new and useful Improvements in Methods and Processes of Refrigerating Milk or other Perishable Foods for Preservation and Transportation, of which the following is a specification.

Heretofore milk has been refrigerated to a temperature more or less above its freezing-point by artificially drawing heat from it by introducing ice into the liquid milk and by introducing congealed milk into the liquid milk. Also the refrigeration of milk and cream has been carried to a temperature where they have been solidly frozen in cakes or bricks in suitable vessels and kept in this form in an artificially-cooled atmosphere until needed for use.

As to the methods that depend for their efficiency on keeping the milk at a low temperature, yet in the liquid form, it can be said that milk and cream cannot be kept in a perfectly sweet condition in the liquid form for an indefinite length of time, while as to the method of freezing milk in refrigerator-cans and keeping it in solidly-frozen blocks, even if perfectly incased in boxes, it must be said that this method of freezing the milk is slow and expensive, and after being frozen it is expensive to keep it in that condition.

The object of my invention is to cheapen and quicken the process of forming milk and other perishable liquids into frozen bricks and to so protect these bricks as to cheapen the cost of keeping and transporting them.

Referring to the sheet of drawings, in which similar characters refer to similar parts, Figure 1 is an end elevation of the freezing apparatus. Fig. 2 is a front elevation in section of my device for solidifying the frozen and chipped liquid food into bricks. Fig. 3 is a perspective view of one of the bricks of solidified liquid incased in telescoping paper boxes. Fig. 4 is a front elevation in section of the apparatus for inclosing the bricks of solidified liquid food in solid ice. Figs. 5, 6, and 7 are three views in sectional front elevation, showing three different stages of the process of putting on the ice covering; and Fig. 8 is a view in perspective of the ice-inclosed food.

In Fig. 1, E is a hollow cylinder revolving in suitable bearings on the horizontal hollow shaft I. A suitable cooling agent, such as compressed ammonia or liquid air, is introduced into the cylinder through one end of the hollow shaft and finds exit from the cylinder through the other end of this hollow shaft. The cylinder E is caused to revolve by the driving-shaft H, to which is rigidly attached the bevel-pinion G, which meshes in the bevel-gear F, rigidly attached to one end of the cylinder. The liquid to be frozen on the cold surface of the revolving cylinder E is delivered through the pipe A into the feed-pipe C. This feed-pipe C occupies a position above the center of and parallel with the cylinder and has a narrow longitudinal slot T in its lower side, through which the liquid flows down onto the cylinder. Screw-clamps B are used to regulate the width of the opening T, and thus control the amount of liquid allowed to fall on the cold cylinder. A cutter K is held in the upper part of the chute J and kept within the desired distance of the cylinder by the nut L on a screw rigidly attached to the cutter. As fast as the liquid falls from the slot T onto the cold revolving cylinder it is congealed and is carried around on the surface of the cylinder until it reaches the cutter K, where it is scraped off and falls into and passes out of the chute J in a frozen and finely-divided condition.

In Fig. 2, 3" is a mold of rectangular horizontal cross-section. 2" is a guide of similar and equal cross-section. 1" is a punch designed to move through guide 2" and into the mold 3", which it nearly fills. N" is a piston-rod attached to the punch 1" and designed to operate the same up and down in the mold by means of power from steam working on suitable attachments to the rod N", which are not illustrated. 9" is a gate turning on a horizontal hinge and designed to close the lower end of the mold 3" or leave it open, as desired, and 10" is a latch to hold the gate 9" in place when it closes the mold.

In order to form a brick from the comminuted frozen liquid food as it comes from the chute J, the punch 1" is elevated until its lower end is near the lower end of the guide 2", when a suitable quantity of the chipped frozen liquid food is placed in the mold 3". The punch is then driven down by steam-pressure with such force that when the pressure is removed the mass adheres together, forming a more or less solid brick. Then the latch 10" is withdrawn to position 10''', which allows the gate 9" to fall to position 9''', and the punch is driven down to the bottom of the mold, expelling the brick of food 12 to the position 12'. The brick is then incased in telescoping paper boxes, as shown in Fig. 3.

In Fig. 4, R is a vertical cylinder. M is a piston working therein. N is a piston-rod attached to said piston. P and P' are ports for the admission and escape of steam or other compressed gas for operating the piston M in the cylinder R. Q is a cylindrical rocker valve for admitting the compressed gas into one port and allowing it after it has done its work to escape from the port through the exhaust-port O, and S is the delivery-pipe through which the compressed gas enters the valve. The lower end of the piston-rod N is rigidly attached to a vertical punch 1, which works in a guide 2 and enters the mold 3 of rectangular horizontal cross-section, which it nearly fills. This punch is hollow and contains the core 7 of rectangular horizontal cross-section. There are two horizontal holes 6 and 6' through the punch 1 and two holes 11 and 11' of same caliber through the core 7. These holes are relatively so placed that when the core 7 is entirely within the punch 1 the holes 6' and 11' register with each other and the core can be held in this position by means of a pin placed in these holes; but when the lower end of the core protrudes a short distance below the lower end of the punch the holes 6 and 11 register with each other and the core can be retained in that position by the pin 4, placed in these holes. This latter position of the core in the punch is illustrated in Fig. 4. By turning the valve Q to the position indicated by dotted lines the compressed gas is admitted below the piston M, which is driven to the upper end of the cylinder to the position M', (indicated by dotted lines;) and the punch and core are drawn up to the position 1', also indicated by dotted lines. A suitable quantity of chipped ice, which has been obtained by freezing water on and cutting the ice from a revolving cold cylinder similar to the one illustrated in Fig. 1, is then placed in the mold and the punch and core are driven down by turning the valve Q to the position indicated in full lines in Fig. 4 with such force that upon the removal of the pressure the mass adheres firmly together, forming a solid layer of ice having a depression or recess of rectangular horizontal cross-section in the middle of its upper surface made by the protruding core 7. The punch and core are then withdrawn and the incased brick 12 is placed on the layer of ice 8 in the depression in the same. The pin 4 is removed, allowing the core 7 to fall down and occupy a position on top of the incased brick 12, which is of about the same size of horizontal cross-section as the core, as shown in Fig. 5. Chipped ice is then placed in the mold around the brick and core and the hollow punch is driven down upon this with such force that when the pressure is removed the mass adheres firmly together, forming the wall of solid ice 8', Fig. 6, around the incased brick 12. The pin 4 is then inserted in the holes 6' and 11' and the punch and core are withdrawn from the mold. Fine ice is put in over the top of the incased brick and its surrounding wall of ice, and this is solidified into the layer of solid ice 8", Fig. 7, by means of pressure from the punch and core in a manner similar to what has already been explained. Then the latch 10 is turned back to position 10', the gate 9 falls to the position 9', and the punch and core are driven down to the bottom of the mold, expelling the block of ice containing the brick of milk to the position 12'. Thus is obtained a brick of solidified liquid food incased in a paper box and surrounded on all sides by a protecting and preserving wall of solid ice, as shown in Fig. 8. In order to preserve this cake, only such precautions are necessary as are required to preserve ice. It can be handled without any protecting-covering, shipped to any distance, and kept for any length of time, so long as the protecting-covering of the ice and the milk are not melted. Until this occurs no influence can reach the brick of milk to injure or change it in any particular. To ship a car-load of such cakes, for instance, they would be so stowed in the car that on the sides and the bottom and top a layer of cakes of ice would intervene between them and the car.

When it is desired to use the ice-incased brick of milk, the ice covering can either be broken away or by first so placing the cake that the top of the box is uppermost the ice can be thawed away with water poured from above without any chance for the water to enter the box containing the brick of milk.

In the above description I have explained how a single brick of frozen milk is inclosed in ice. Practically, however, it is best to include a number of bricks in the same cake of ice when the bricks of milk weigh about two pounds each. In this case a number of depressions equal to the number of bricks to be included in one cake are made in the upper surface of the foundation layer of ice. The incased bricks are placed in the depressions, one in each depression. A punch is used having a number of cores equal to the number of bricks in the mold. These cores are placed on top of the bricks. Fine ice is placed between and around the bricks and also between and around said cores, and the subsequent parts of the operation are performed substantially as already described.

When it is desired to separate the inclosed bricks from each other, it can be readily done by splitting or sawing asunder the partitions of ice between the bricks of milk.

I do not wish to be understood as limiting myself to the treatment of milk and cream and the liquid derivatives of milk, for I also use the same process in treating any perishable liquid food that may be preserved in a frozen condition. Neither do I limit myself to the precise mechanical process described.

When desirable, I sterilize the liquid food by raising its temperature to the proper degree before refrigerating it.

The boxes used to incase the frozen liquid food may be of any suitable material or any suitable form; but for the two-pound bricks I prefer to use boxes made of strong paraffined paper. Each box has a cover with sides so deep as to reach the bottom of the box.

Having thus described my invention, what I claim as new, and desire to secure by Letters Patent, is—

1. In the refrigeration of milk or other liquid food, the described process which consists in freezing the liquid into a brick by regelation; boxing or incasing the same; forming a layer of solid ice on the bottom of a mold larger than the incased brick by pressure on chipped or comminuted ice; placing the incased brick on said layer of solid ice, forming solid ice in the space between the sides of the mold and the incased brick by pressure or comminuted ice placed therein; forming a layer of solid ice over the top of the incased brick and the surrounding ice by pressure on comminuted ice; and removing the composite cake thus formed from the mold.

2. In the refrigeration of milk and other liquid food the described process which consists in freezing the liquid into bricks by regelation; suitably boxing or incasing the same; forming a layer of solid ice on the bottom of a mold larger than the added dimensions of the bricks to be included in one cake, by pressure on comminuted ice; placing said incased bricks on said layer of ice suitably separated and arranged; forming solid ice in the spaces between the incased bricks and between them and the side of the mold by pressure on comminuted ice; forming solid ice over said incased bricks and the surrounding walls of ice by pressure on comminuted ice; and removing the composite cake thus formed from the mold.

3. In the refrigeration of liquid food the method which consists in assembling said food after it has been frozen and comminuted, into bricks by pressure according to the law of regelation; suitably boxing or incasing the same; placing said incased bricks into a mold with fine ice; applying sufficient pressure to said fine ice to solidify the same, according to the law of regelation into a coating of ice around said incased bricks.

In testimony that I claim the foregoing as my invention I have signed my name, in presence of two witnesses, this 13th day of December, 1898.

DAVID E. LAIN.

Witnesses:
JOHN MCWILLIAMS,
CHAS. E. GARDNER.